Feb. 13, 1968     D. G. MOATES     3,368,633
DUSTLESS DRILLING APPARATUS
Filed Oct. 22, 1965     3 Sheets-Sheet 1
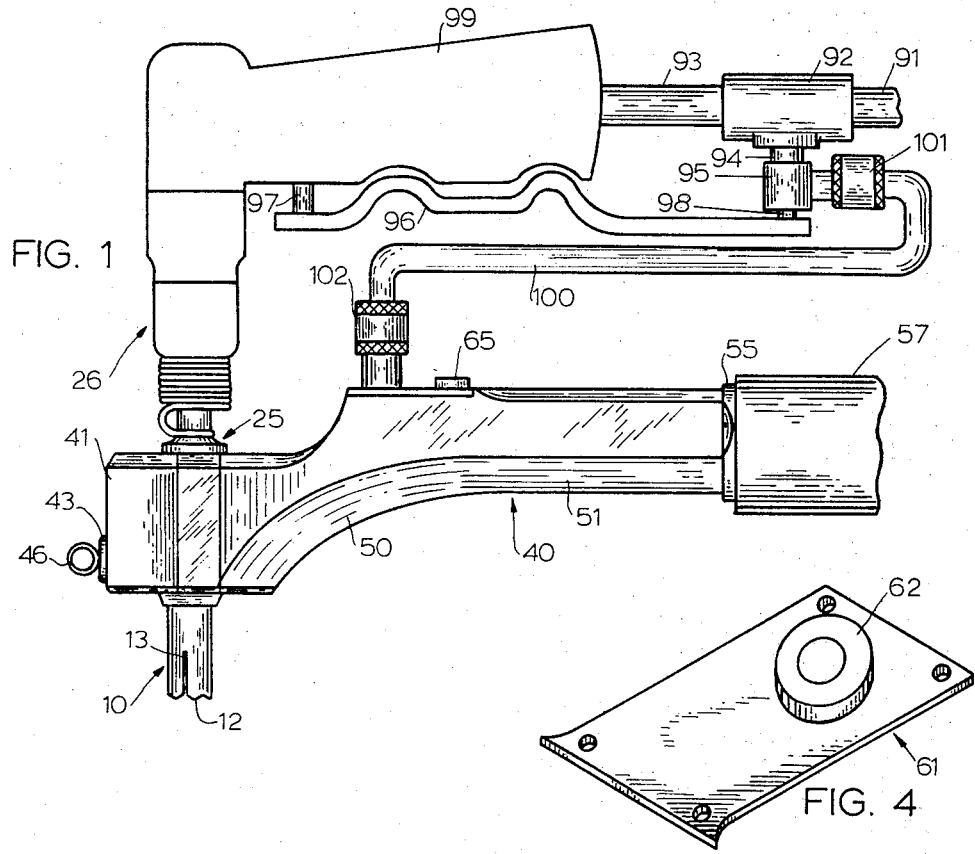
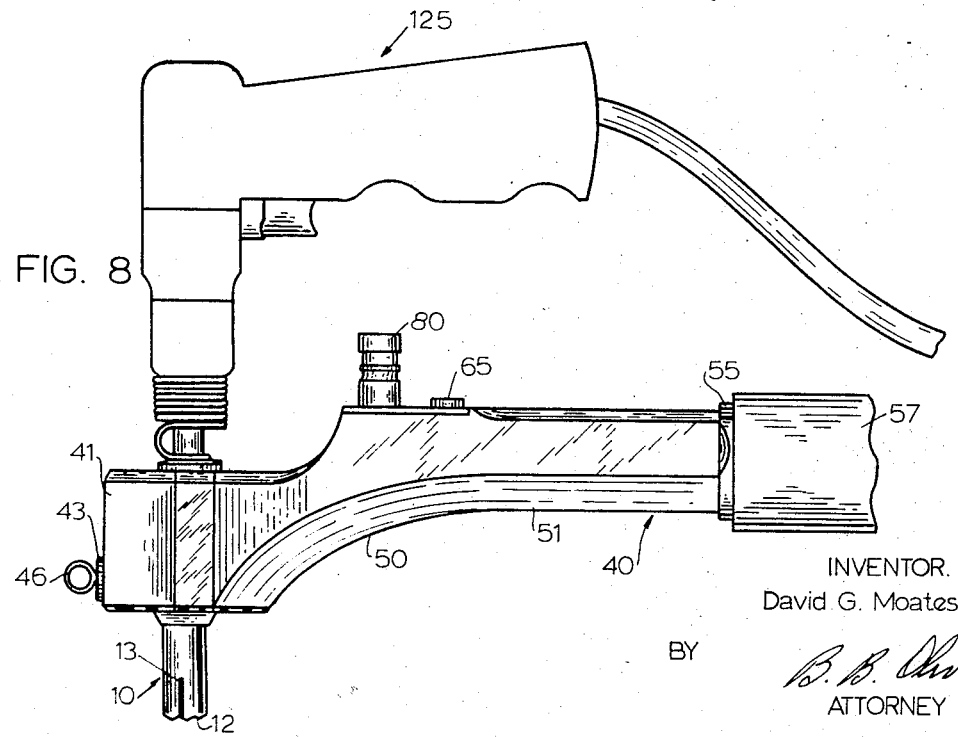
INVENTOR.
David G. Moates
BY
*B. B. Olive*
ATTORNEY Feb. 13, 1968  D. G. MOATES  3,368,633
DUSTLESS DRILLING APPARATUS
Filed Oct. 22, 1965  3 Sheets-Sheet 2
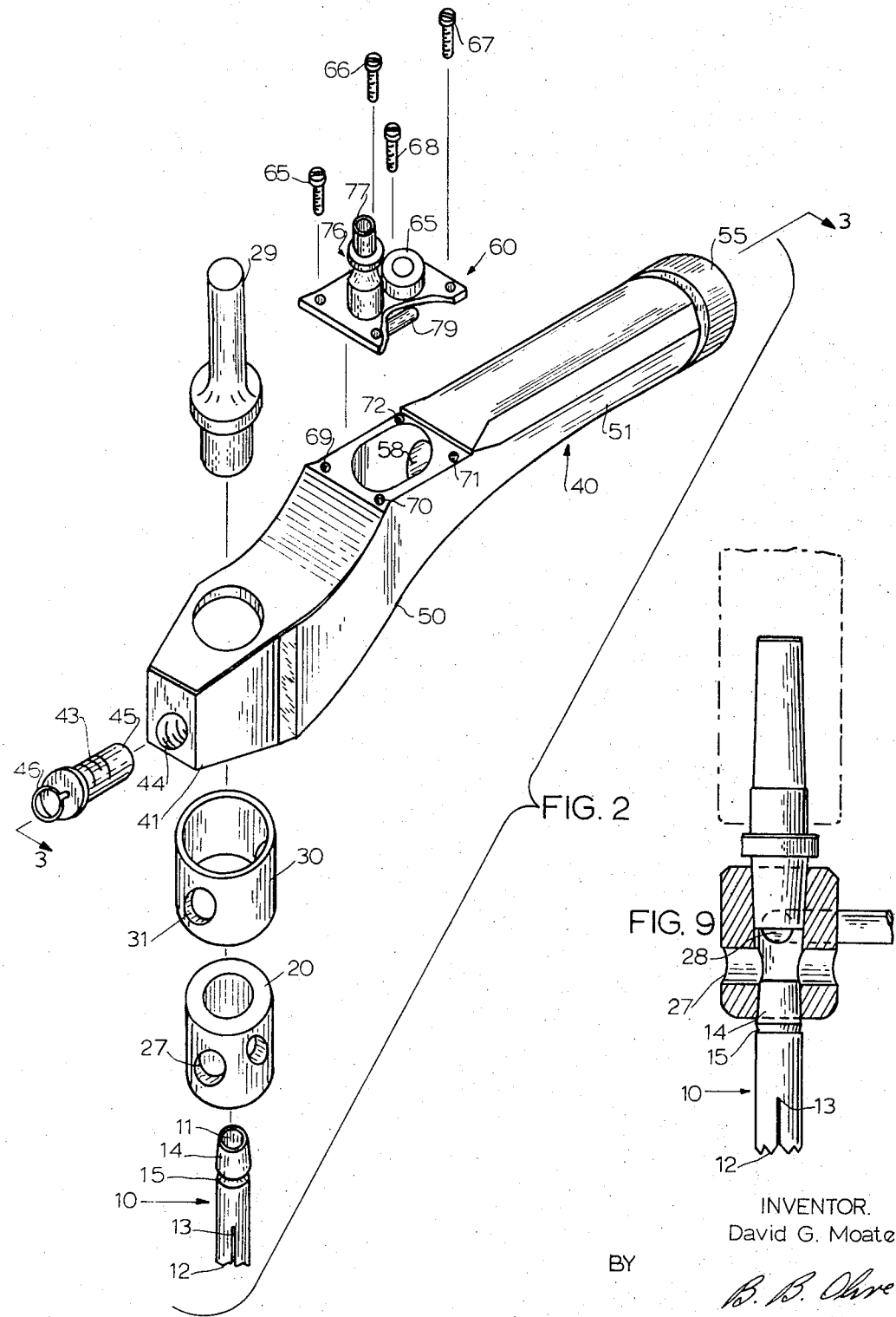
INVENTOR.
David G. Moates
BY
B. B. Olive
ATTORNEY Feb. 13, 1968     D. G. MOATES     3,368,633

DUSTLESS DRILLING APPARATUS

Filed Oct. 22, 1965             3 Sheets-Sheet 3

INVENTOR.
David G. Moates

BY

*B. B. Olive*

ATTORNEY

United States Patent Office 3,368,633
Patented Feb. 13, 1968

3,368,633
DUSTLESS DRILLING APPARATUS
David G. Moates, Roanoke Rapids, N.C., assignor to Trade Tools, Inc., Roanoke Rapids, N.C., a corporation of North Carolina
Filed Oct. 22, 1965, Ser. No. 502,073
12 Claims. (Cl. 173—60)

This invention relates generally to an apparatus for installing self-drilling concrete fasteners and, more particularly, to an apparatus for drilling holes in masonry objects which is adaptable to receive interchangeable chucks and which has a vacuum dust-collecting system to remove and confine the debris produced by the drilling.

Hollow drill bits or concrete fasteners, as taught by the prior art, are pounded into concrete, stone or other masonry objects and are used to anchor heavy machinery such as printing presses and heavy duty lathes. Upon hammering a drill bit into concrete, chips, material pieces and dust particles are generated thereby and usually accumulate and remain within the hollow drill bit or within the hole being drilled, thereby retarding the drilling rate and necessitating a cleaning of the hole subsequent to the drilling operation. The prior art teaches removing the debris in the hole produced by the drill bit by means of providing a chuck, which receives one end of the drill bit, with an extension or the like which is connected to a vacuum source. Since drill bits come in a variety of sizes, it is necessary to provide a chuck for each size drill bit. Since the art does not teach the incorporation of a vacuum source with a standard chuck, each chuck must be altered to receive the vacuum inducing source. In most cases, the cost of adapting a standard chuck to receive a vacuum inducing source is prohibitive; therefore, the use of vacuum in combination with an apparatus for imbedding drill bits in a surface, while theoretically feasible, is practically nonexistent. An improvement to the art is to be found in the flexible vacuum coupling taught in my application, Ser. No. 252,699, filed Jan. 21, 1963, now U.S. Patent No. 3,220,742, entitled Vacuum Coupling for Self Drilling Anchor Chucks and which for the first time makes it practical to connect vacuum to any standard size self drilling anchor chuck.

Therefore, a primary object of this invention is to provide an improved apparatus for imbedding self drilling fasteners, which include any of the standard sizes, into a solid surface while having a vacuum actuated system for the egress of chips and dust particles from the hole being drilled.

Another object of this invention is to provide a masonry drilling apparatus with a handle having a tubular passageway therein which by the passage of air therethrough is adapted to draw dust particles and debris from the hole being drilled through the same and into a receptacle.

A further object of this invention is to provide a masonry drilling apparatus with a leveling device.

Still another object of this invention is to provide a masonry drilling apparatus with a debris removing system which is operable either by means of compressed air or by means of a vacuum and which is adapted to both electric and compressed air type percussion hammers.

Yet a further object of this invention is to provide a masonry drilling apparatus with a suction line which is in communication with the passageways of a standard chuck so as to remove the debris and dust particles from the hole produced thereby without having to alter either the chuck or the drill bit.

Yet another object of this invention is to provide a masonry drilling apparatus which is adapted to remove the debris produced by the imbedding of a drill bit in overhead locations.

Still another object of this invention is to provide an apparatus of the character described herein which is economical to manufacture and which reduces hammer maintenance.

Other objects and advantages of this invention will become apparent when the following description is read in conjunction with the appended drawings, specification and claims. Preferred embodiments of this invention will now be described with reference to the accompanying drawings, in which:

FIGURE 1 is a front elevational view of the apparatus showing the handle structure receiving a drill bit and connecting with a pneumatic air hammer;

FIGURE 2 is an exploded, pictorial view of the handle structure showing the various elements which comprise the same;

FIGURE 4 is a pictorial view of a top plate having mounted thereon a level;

FIGURE 8 is a front elevational view of the apparatus showing the handle structure receiving a vacuum coupling and an electric percussion drill; and FIGURE 9 is a sectional elevation view taken through a prior art chuck showing the chuck frictionally receiving a drill bit and an adaptor and showing the position of the usual handle.

Figure 3:
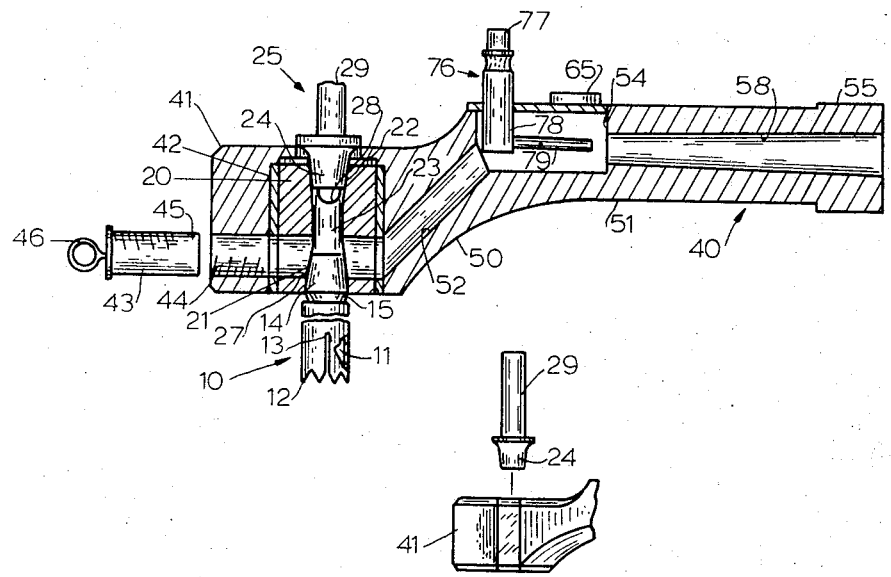
FIGURE 3 is a sectional, elevational view of the handle strucure taken along line 3—3 of FIGURE 2, showing the same having received a chuck and drill bit and adapted to remove the debris produced by the drilling of a hole by means of compressed air.

In this invention, a standard self-drilling expansion bit having sharp axially directed teeth at one end, an axially centered passageway extending the length thereof and an opposite tapered end is received by a cylindrical chuck in a tapered socket. The self-drilling expansion bit and the chuck are of a common type used in the art, the well known Phillips bit and chuck being an example. The chuck with the expansion bit securely seated in a tapered opening therein is received by a handle structure and is securely held therein by a locking bolt which extends through a side of the handle and into a perpendicularly arranged opening in the chuck which is normally used for the ejection of the expansion bits by means of a suitable wedge. It is the handle structure to which the invention is principally directed. With the chuck securely mounted in the handle, a tapered opening in the upper part of the chuck receives an adapter which is directly connected to a percussion hammer. The percussion hammer may either be electrically or pneumatically operated. It is contemplated that when using a pneumatically operated percussion hammer, pressurized air will be supplied to the handle structure therefrom for creating a vacuum in the handle structure which removes the debris of drilling from the bored hole. If an electrically operated percussion hammer is to be used, the vacuum may be created in the handle structure by a vacuum source connected thereto or by a source of compressed air.

The invention is illustrated in connection with the accompanying drawings in which the figures are illustrative of the preferred embodiment of the invention.

The self-drilling expansion bit is generally represented by the reference numeral 10 and is cylindrical in shape having an axially extending passageway 11. One end of drill bit 10 is provided with axially aligned teeth 12 which are hardened to prevent excessive wear. Axially extending grooves 13 are provided on the drill bit body at the tooth end to enable the expansion of the bit when installed in the drill hole. Drill bit 10 is provided with a tapered end 14 and is separated from the body of the drill bit 10 by an annular fracture groove 15. Annular fracture groove 15 provides a weakened area in drill bit 10 which adapts tapered end 14 to be broken off from the main body thereof by a sudden lateral strain after the same has been hammered in a surface.

Tapered end 14 of drill bit 10 is frictionally received by socket 21 of chuck 20 as shown in FIGURE 3. Chuck 20 which is cylindrical in shape is a standard prior art item and may be purchased to fit any size drill bit. Socket 21 has a frusto-conical design and has a common axis with the cylindrical body of chuck 20. Chuck 20 is provided with a second socket 22 which is axially aligned therewith and with socket 21 and by connecting socket 22 with socket 21, a continuous passageway 23 through chuck 20 is formed. Sockets 21 and 22 converge toward the center of chuck 20. Socket 22 receives and frictionally holds therein tapered end 24 of anvil 25 which is in turn connected to a percussion hammer 26. Chuck 20 is also provided with a traverse passageway 27 which passes completely through it and which is adapted to receive a drift pin or some other similar ejector tool (not shown) which is adapted to wedgingly disengage and force tapered end 14 from socket 21. Another traverse passageway 28 is located in chuck 20 preferably at right angles to passageway 27. Ordinarily a handle would engage passageway 28; however, in this invention passageway 28 is not needed for the handle of the prior art and is not to be used.

Figure 7:
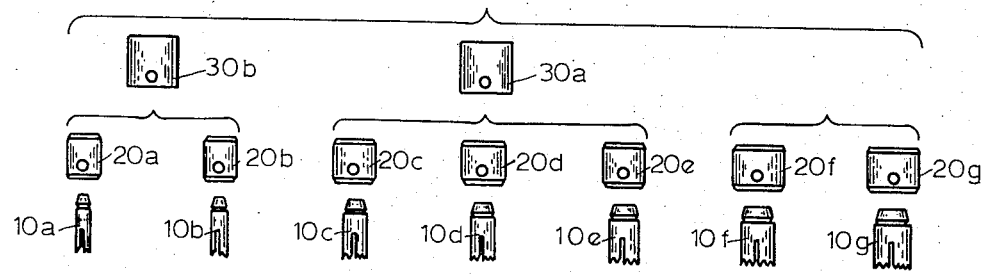
FIGURE 7 is a diagrammatic view of the various chucks and drill bits which may be incorporated into the handle structure.
Figure 5:
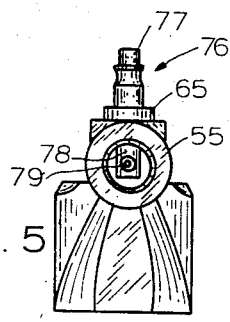
FIGURE 5 is a right side elevational view of the handle structure showing the compressed air connection and the diverging passageway of the hand grip portion.
Figure 6:
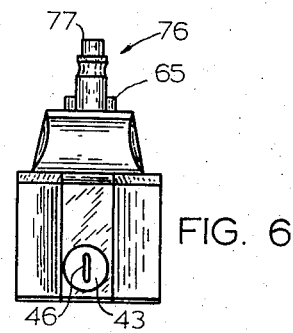
FIGURE 6 is a left hand elevational view of the handle structure showing the chuck housing and the locking bolt mounted therein.

In reference to FIGURE 7, chuck receiving end or housing 41 of handle 40 is adapted to receive a variety of sizes of chucks in receptacle 42 of chuck receiving end 41. The prior art drill bits are substantially the size as shown in FIGURE 7 (the same being proportionately reduced) and have the reference numerals 10a through 10g which are received by chucks 20a through 20g, respectively. Chucks 20 are standardized into three diameters, small—which includes chucks 20a, 20b, medium—which includes chucks 20c, 20d and 20e, and large—which includes chucks 20f and 20g. Chucks 20f and 20g have an outer diameter substantially equal to the inner diameter of chuck receptacle 42 and are slidably received thereby. Chucks 20c, 20d and 20e which have a medium diameter will not seat in chuck receptacle 42; therefore, a sleeve 30a having an outside diameter substantially equal to the inside diameter of chuck receptacle 42 and having an inside diameter substantially equal to the outside diameter of chucks 20c, 20d and 20e is provided for the medium size group of chuck 20, thereby adapting chucks 20c, 20d and 20e to be received by chuck receptacle 42.

The small size chucks 20a and 20b are provided with a sleeve 30b which in turn adapts those chucks to be received by chuck receptacle 42. Therefore, it can be seen that handle 40 is adapted to receive any size chuck and any size drill bit by the arrangement and rearrangement of sleeves 30a and 30b. Sleeve 30 is provided with a hole 31 which has a diameter substantially equal to that of passageway 27 of chuck 20. Sleeve 30 and chuck 20 are positioned in chuck receptacle 42 and held securely therein by locking bolt or screw means 43 which is threadable received by threaded opening 44. Locking bolt 43 is provided with a smooth end 45 which extends through opening 31 of sleeve 30 and into passageway 27 of chuck 20. Locking bolt 43 is provided with a hand engaging ring 46 which is rigidly mounted thereon for facilitating the turning thereof.

Handle 40 is further comprised of a neck portion 50 which is an integral and lateral extension of chuck receiving portion or housing 41 and connects chuck receiving portion 41 to hand gripping portion 51 which is also an integral extension of neck 50. Neck 50 is provided with a passageway 52 which is in communication with passageway 31 of sleeve 30 and 27 of chuck 20. Passageway 27 of chuck 20 is in communication with cylindrical opening 23 of chuck 20 and passageway 11 of drill bit 10 thereby establishing an air communication between drill bit 10 and circular passageway 52 of neck 50. Hand grip portion 51 includes an opening 54 which is in communication with passageway 52 of neck 50 and which is selectively opened to the atmosphere. Hand grip portion 51 is provided with a braided end 55 which is adapted to receive a dust bag (not shown) or a vacuum coupling 57 as shown in FIGURE 8. An air passageway 58 connects opening 54 with a dust bag or vacuum coupling 57. Passageway 58 is divergingly tapered from opening 54 thereby substantially defining a Venturi tube.

Opening 54 is adapted to be covered by cover plate 60 as shown in FIGURE 2 or cover plate 61 (see FIGURE 4). Cover plate 61 is used when end 55 is connected to vacuum coupling 57 which extends to a vacuum source (not shown) and plate 60 is used when compressed air is forced into handle 40. Cover plate 61 is securely positioned over opening 54 by any convenient means such as screws (not shown) and is provided with a level 62 which is preferably of a bulls-eye type and which enables the common axis of the bit and chuck to be positioned perpendicular to a level plane. Cover plate 60 is adapted to be placed over hole 54 and securely positioned on handle 40 by means of screws 65, 66, 67 and 68 which are respectively received by threaded openings 69, 70, 71 and 72. Cover plate 60 is provided with a level 65 which is similar to level 62 and is provided with a hollow shaft 76 which has a compressed air hose engageable end 77 and an air outlet end 78 which is positioned in opening 54. Air outlet end 78 is provided with a tubular extension 79 which is in axial alignment with passageway 58 for directing the compressed air being forced from tubular extension 79 through passageway 58 and into a dust bag. As the compressed air rushes down passageway 58, a vacuum is created in opening 54 which is ultimately transmitted to passageway 11 of expansion drill bit 10. If compressed air is not supplied to handle 40 by means of hollow shaft 76, a cap 80 is snapped on end 77 of shaft 76 thereby preventing atmospheric air from entering handle 40 through hollow shaft 76 when handle 40 is connected to a vacuum source.

A pneumatic air hammer 26 of the standard type is adapted to receive shaft 29 of anvil 25 and is connected to a compressed air source by means of line 91. Line 91 enters a T-joint 92 which directs the compressed air into line 93 which enters pneumatic air hammer 26 and into line 94 which directs a portion of the compressed air into spring actuated air valve 95. A trigger arm 96 is connected to a piston 97 which actuates an air valve (not shown) in pneumatic air hammer 26 and to piston 98 which actuates air valve 95. Upon forcing trigger 96 upwardly toward grip 99 of pneumatic air hamer 26, pistons 97 and 98 respectively actuate pneumatic air hammer 26 and air valve 95. Upon actuating air valve 95, a quick disconnect coupling 101 allows compressed air to enter hollow shaft 76 by means of tube 100 which is connected thereto by means of quick disconnect coupling 102.

In operation, a drill bit 10 is selected and the tapered end 14 thereof is inserted into tapered socket 21 of chuck 20. Chuck 20, having received drill bit 10, is inserted in sleeve 30 (assuming the sleeve is required). Chuck 20 and sleeve 30 are received by chuck receptacle 42 of handle 40 and are held therein by locking bolt 43 having been turned so that smooth portion 45 is received by opening 31 of sleeve 30 and passageway 27 of chuck 20. A tapered end 24 of adapter 25 is received by tapered socket 22 of chuck 20. By inserting smooth end 45 of locking bolt 43 into passageway 27 of chuck 20 and into opening 31 of sleeve 30, the remainder of passageway 27 and opening 31 is in communication with passageway 52 of neck 50.

The apparatus is made operational by connecting pneumatic air handle 26 to shaft 29 of adapter 25 and by connecting pressurized air line 100 to air inlet 76. Line 91 is then connected to a compressed air source (not shown) and pneumatic air hammer 26 hammers drill bit 10 into a masonry object upon squeezing trigger 96 inwardly toward handle portion 99 of hammer 26. Simultaneously or selectively, compressed air is allowed to enter handle 40 through tube 100 by energizing air valve 95. The compressed air enters handle 40 through air connection shaft 76. The compressed air is directed from shaft 76 into opening 54 and diverging passageway 58 by means of tube 79 which is an integral part of air connecting shaft 76. As the air rushes down the Venturi passageway 58, a vacuum is created in the portion behind the nozzle of tube 79 thereby creating a vacuum in passageway 52 of neck 50. With passageway 52 being in communication with passageway 11 of drill bit 10, by means of opening 31, passageway 27 and passageway 23, a vacuum is induced therein thereby drawing chips, dust and other debris which are produced by the drilling of the hole in the masonry up through passageway 11 of drill bit 10, into passageway 23 of chuck 20, out through passageway 27 of chuck 20 and opening 31 of sleeve 30, through passageway 52 of neck 50, into opening 54 of hand grip portion 51 and ultimately through diverging passageway 58 and into a dust collecting bag (not shown).

Where an electric percussive hammer 125 is to be used, a vacuum source is connected to end 55 of handle 40 and top plate 60 is replaced by top plate 61. Upon inducing a vacuum in handle 40, the chips and debris are drawn up through the same passageways described above and into a vacuum cleaner type receptacle (not shown).

The apparatus is adapted to be easily handled and by only one person in that the user places one hand on the handle 40 and the other hand on handle structure 99 of percussive hammer 26; therefore, the apparatus is adapted to be turned in any direction which facilitates the drilling of the hole and loosening of the debris therein both in floor, overhead and side drilling. In overhead drilling, the debris may be collected solely by action of gravity and allowed to collect within the handle 40 or within a bag attached to end 55.

The use of a masonry drill bit 10 as illustrated in the drawings is well known in the prior art. Bit 10 is used to drill a hole in a masonry object; and subseqeuent to the drilling operation, the drill bit 10 is removed from the hole and a tapered plug (not shown) is inserted in the end of drill bit 10. Drill bit 10 is then reinserted into the hole and is driven therein by a hammer (not shown) and the tapered plug spreads the end of the bit 10 by reason of the groove slots 13. When the drill bit 10 is thus anchored, the tapered end 14 thereof is broken off by the operator's exerting a lateral strain thereagainst. The tapered portion 14 remains within the tapered passageway 21 of chuck 20 and is ejected therefrom by withdrawing locking bolt 43 and removing chuck 20 from handle 40 and inserting a tapered drift pin (not shown) through passageway 27 of chuck 20.

Thus it can be seen that the apparatus of the present invention alleviates the difficulties of the prior art by providing a masonry drilling apparatus which is operable by one man working alone and which utilizes a vacuum-actuated system for the egress of chips and dust particles from the hole being drilled, the passage of the chips and dust particles being internally of the drill bit and tool body thereof. The overall result is such as to greatly accelerate the drilling operation and, at the same time, provide a clean, smooth hole. It should also be noted that this invention is primarily concerned with self-drilling expansion bits; however, the improvements made herein adapt the apparatus to be used as a regular drill in that by removing the dust and debris from the drilled hole continuously, the teeth of the drill bit do not wear out and may be used for several drillings.

Many different embodiments of this invention may be made without departing from the scope and spirit thereof. Therefore, it is to be understood that the invention is not limited to the specific embodiments shown and described herein, except as defined in the appended claims.

I claim:

1. In combination with a percussive hammer for boring a hole in a masonry object and having adaptor means for engaging and driving a chuck, said chuck including a substantially cylindrical body having one end for engagement with said adaptor means and a socket at the other end adapted to frictionally received the end of a self-drilling expansion bit, said chuck body being provided with a traverse passageway having its axis substantially perpendicular to the axis of said body and intersecting said socket so that said end of said bit is in communication with said traverse passageway; handle means having a hollow housing open at one end for receiving said chuck while providing passage for said adaptor; a neck portion integral with and extending laterally from said housing and having a passageway communicating with said traverse passageway of said chuck, a hand grip portion integral with and forming a continuation of said neck portion and having a passageway in communication with said passageway of said neck portion and continuing the length of said hand grip portion; and means for creating a vacuum in said passageways whereby dust, chips and debris may be withdrawn from said hole and expelled through said handle means.

2. The combination of claim 1 wherein said vacuum creating means comprises tube means having an inlet mounted externally and an outlet mounted internally of said handle means, and a compressed air source connected to said inlet for causing compressed air to be expelled from said outlet, said outlet being oriented within said handle means to create said vacuum upon the application of said air.

3. The combination of claim 2 including a plate mounting said tube means and being removably mounted on said handle means at a position intermediate said neck and hand grip portions.

4. The combination of claim 2 wherein said percussive means comprises an air hammer and valve means mounted adjacent said hammer for simultaneously connecting and disconnecting said source from both said hammer and tube means inlet.

5. The combination of claim 1 including leveling means mounted and arranged thereon to indicate the perpendicularity of the common axis of said adaptor, chuck and bit.

6. The combination of claim 5 wherein said leveling means is of the bulls-eye type designed to level a plurality of planes.

7. The combination of claim 1 wherein said vacuum creating means is connected to said hand grip portion and creates a vacuum in the passageway therein.

8. In the combination of claim 1 including means to temporarily lock said chuck in said housing and being effective to maintain said chuck traverse passageway in communication with said neck portion passageway.

9. In the combination of claim 1 including a plurality of open ended sleeves of different sizes fitted to respective different sizes of said chuck whereby different sizes of said chuck may be mounted in said housing to receive different sizes of said bit, said sleeves each having a traverse passageway mating with and being a continuation of the respective traverse passageway of a respective said chuck.

10. In the combination of claim 9 including means to temporarily lock the respective sleeve and chuck mounted in said housing and being effective to maintain both said chuck and sleeve traverse passageways in communication with said neck portion passageway.

11. The combination of claim 10 wherein said housing includes a threaded hole extending through the wall thereof perpendicular to the central axis of said housing and said locking means comprises screw means removably secured in said threaded hole.

12. The combination of claim 1 wherein the passageway in said hand grip portion diverges outwardly from the juncture of said neck and hand grip passageways.

References Cited

UNITED STATES PATENTS

| | | | |
|---|---|---|---|
| 1,084,152 | 1/1914 | Kessel | 173—60 |
| 2,918,290 | 12/1959 | Werstein | 279—19 |
| 3,070,382 | 12/1962 | Dieterich | 279—103 |
| 3,220,742 | 11/1965 | Moates | 279—1 |
| 3,294,182 | 12/1966 | Filander et al. | 173—77 |

FRED C. MATTERN, Jr., *Primary Examiner.*

L. P. KESSLER, *Assistant Examiner.*